(12) United States Patent  (10) Patent No.: US 9,323,547 B2
Jayamohan  (45) Date of Patent: Apr. 26, 2016

(54) VIRTUAL MACHINE AND/OR MULTI-LEVEL SCHEDULING SUPPORT ON SYSTEMS WITH ASYMMETRIC PROCESSOR CORES

(71) Applicant: Microsoft Corporation, Redmond, WA (US)

(72) Inventor: Ajith Jayamohan, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 531 days.

(21) Appl. No.: 13/857,305

(22) Filed: Apr. 5, 2013

(65) Prior Publication Data

US 2013/0227571 A1   Aug. 29, 2013

Related U.S. Application Data

(62) Division of application No. 12/896,415, filed on Oct. 1, 2010, now Pat. No. 8,418,177.

(51) Int. Cl.
*G06F 9/455* (2006.01)
*G06F 9/50* (2006.01)

(52) U.S. Cl.
CPC ............ *G06F 9/455* (2013.01); *G06F 9/45558* (2013.01); *G06F 9/5044* (2013.01); *G06F 9/5077* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| 7,356,817 B1 | 4/2008 | Cota-Robles et al. |
| 7,797,512 B1 * | 9/2010 | Cheng ..................... G06F 9/455 712/10 |
| 7,873,776 B2 | 1/2011 | Hetherington et al. |
| 8,161,482 B1 * | 4/2012 | Sakarda ............... G06F 9/5027 718/102 |
| 8,281,308 B1 | 10/2012 | Cheng et al. |
| 8,418,177 B2 | 4/2013 | Jayamohan |
| 2006/0004942 A1 | 1/2006 | Hetherington et al. |

(Continued)

FOREIGN PATENT DOCUMENTS

CN    101430649    5/2009

OTHER PUBLICATIONS

"Foreign Office Action", Chinese Application No. 201110317869.5, (Aug. 21, 2013), 13 Pages.

(Continued)

*Primary Examiner* — Kenneth Tang
(74) *Attorney, Agent, or Firm* — Sandy Swain; Judy Yee; Micky Minhas (57) ABSTRACT

Different processor cores in a computing device can support different features. In one or more embodiments, the features supported by each of multiple physical processor cores of a computing device are identified. A set of one or more features of the multiple physical processor cores to make available to virtual processor cores of the virtual machine are determined based at least in part on both the one or more features supported by each of the multiple physical processor cores and a number of virtual processor cores of the virtual machine. In additional embodiments, a multi-level scheduling model is used. An operating system level scheduler of an operating system schedules multiple applications for execution on multiple processor cores, and a user level scheduler of an application schedules application threads of that application for execution on one or more of the multiple processor cores.

20 Claims, 8 Drawing Sheets

(56) References Cited

U.S. PATENT DOCUMENTS

| | | | |
|---|---|---|---|
| 2007/0043531 A1* | 2/2007 | Kosche | G06F 11/3447 702/182 |
| 2008/0155536 A1 | 6/2008 | Levit-Gurevich et al. | |
| 2009/0019442 A1 | 1/2009 | Liu | |
| 2009/0157936 A1* | 6/2009 | Goss | G06F 1/3203 710/264 |
| 2011/0161955 A1 | 6/2011 | Woller et al. | |
| 2012/0079479 A1* | 3/2012 | Hakewill | G06F 9/45558 718/1 |
| 2012/0084777 A1 | 4/2012 | Jayamohan | |

OTHER PUBLICATIONS

"Foreign Notice of Allowance", CN Application No. 201110317869.5, Feb. 6, 2015, 4 Pages.

"Foreign Office Action", CN Application No. 201110317869.5, Apr. 23, 2014, 11 Pages.

"Foreign Office Action", CN Application No. 201110317869.5, Jul. 30, 2014, 7 Pages.

"Non-Final Office Action", U.S. Appl. No. 12/896,415, (Oct. 26, 2012), 13 pages.

"Notice of Allowance", U.S. Appl. No. 12/896,415, (Dec. 7, 2012), 14 pages.

"User-Mode Scheduling", Retrieved from: <http://msdn.microsoft.com/en-us/library/dd627187(VS.85,printer).aspx) on Aug. 18, 2010, (2010), 4 pages.

Becchi, Michela "Dynamic Thread Assignment on Heterogeneous Multiprocessor Architectures", *In Proceedings of CF 2006*, Available at <http://www.arl.wustl.edu/~pcrowley/CF_hetcmp.pdf>,(May 2006), pp. 29-39.

Kazempour, Vahid et al., "AASH: An Asymmetry-Aware Scheduler for Hypervisors", *In Proceedings of VEE 2010*, Available at <http://www.cs.sfu.ca/~fedorova/papers/vee04-kazempour.pdf>,(Mar. 2010), 12 pages.

Li, Tong et al., "Efficient Operating System Scheduling for Performance-Asymmetric Multi-Core Architectures", *In Proceedings of SC 2007*, http://www.google.co.in/url?sa=t&source=web&cd=2&ved=0CCEQFjAB&url=http%3A%2F%2Fciteseerx.ist.psu.edu%2Fviewdoc%2Fdownload%3Fdoi%3D10.1.1.123.7855%26rep%3Drep1%26type%3Dpdf&ei=M5hbTJKKKYyM0gTexfxs&usg=AFQjCNEMCZDrgnsWk5U3shP14bfOWL0a-Q&sig2=if-ftMliL8sNsoo, (Nov. 2007), 11 pages.

Saez, Juan C., "A Comprehensive Scheduler for Asymmetric Multicore Systems", *In Proceedings of EuroSys 2010*, Available at <http://www.cs.sfu.ca/~fedorova/papers/eurosys163-saez.pdf>,(Apr. 2010), 14 pages.

Shelepov, Daniel et al., "HASS: A Scheduler for Heterogeneous Multicore Systems", *ACM SIGOPS Operating Systems Review*, vol. 43, Issue 2, Available at <http://www.sfu.ca/~zfh/HASS.pdf>,(Apr. 2009), 10 pages.

* cited by examiner

VIRTUAL MACHINE AND/OR MULTI-LEVEL SCHEDULING SUPPORT ON SYSTEMS WITH ASYMMETRIC PROCESSOR CORES

RELATED APPLICATIONS

This application is a divisional of, and claims priority to, U.S. patent application Ser. No. 12/896,415, filed on Oct. 1, 2010, and entitled "Virtual Machine and/or Multi-level Scheduling Support on Systems with Asymmetric Processor Cores," the disclosure of which is incorporated in its entirety by reference herein.

BACKGROUND

Computer manufacturers oftentimes use chips that include multiple processor cores in order to improve performance. Situations can arise where different processor cores on the same chip support different features, which can be referred to as asymmetric processor cores. The use of asymmetric processor cores in a computer, however, is not without its problems. One such problem is that it can be difficult to run virtual machines having multiple virtual processor cores on such a computer because there is typically no permanent correlation between a virtual processor core and a particular processor core of the computer running that virtual processor core. This can lead to situations where a virtual processor core is limited to using only features that are supported by all of the physical processor cores, which reduces the benefits of having asymmetric processor cores.

Another problem with using asymmetric processor cores in a computer is that it can be difficult for the operating system and application to manage the heterogeneous nature of the system on which they are running. This can lead to situations where system threads or application threads are scheduled on cores that do not support functionality used by the threads, and can cause functional issues in certain situations and performance issues in other cases due to attempts to execute instructions that are undefined for particular cores.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more features supported by each of multiple physical processor cores of one or more processors of a computing device are identified. A number of virtual processor cores of a virtual machine of the computing device are also identified. A set of one or more features of the multiple physical processor cores to make available to the virtual processor cores of the virtual machine are also determined based at least in part on both the one or more features supported by each of the multiple physical processor cores and the number of virtual processor cores of the virtual machine. The set of one or more features of the multiple physical cores are made available to the virtual processor cores of the virtual machine.

In accordance with one or more aspects, an undefined opcode exception is received from a physical processor core on which a virtual processor core of a virtual machine managed by a virtual machine manager of a computing device is scheduled. An instruction that caused the undefined opcode exception is identified, and a check is made as to whether the instruction is supported by one or more physical processor cores of the computing device. If the instruction is not supported by the one or more physical processor cores, then the instruction is provided to an operating system of the computing device (e.g., a host operating system or guest operating system of the virtual machine that includes the virtual processor core). If the instruction is supported by the one or more physical processor cores, then the virtual processor core is scheduled on a different physical processor core than the virtual processor core was scheduled on when the undefined opcode exception arose, and after scheduling the virtual processor core on the different physical processor core the virtual processor core is indicated to attempt to execute the instruction again.

In accordance with one or more aspects, for each of multiple processor cores of the computing device, one or more features supported by the processor core are identified. Multiple applications are scheduled, by an operating system level scheduler of an operating system of the computing device, for execution on the multiple processor cores. Application threads of one application of the multiple applications are scheduled, by a user level scheduler of the one application, for execution on one or more of the multiple processor cores.

BRIEF DESCRIPTION OF THE DRAWINGS

The same numbers are used throughout the drawings to reference like features.

DETAILED DESCRIPTION

Virtual machine and/or multi-level scheduling support on systems with asymmetric processor cores is discussed herein. In one or more embodiments, a virtual machine manager on a computing device identifies features supported by each of the physical processor cores of the computing device. The virtual machine manager determines which of the features of the physical processor cores are to be made available to virtual processor cores of a virtual machine on the computing device. This determination is made, for example, based on the features of each of the individual processor cores and how many virtual processor cores are included in the virtual machine. Additionally, the situation may arise in which an attempt to execute an instruction on a virtual processor core results in an indication from the physical processor core on which that virtual processor core is scheduled that the instruction is undefined (indicating that that physical processor core does not support the instruction). In such a situation, the virtual machine manager schedules the virtual processor core for another physical processor core that does support the instruction.

Additionally, in one or more embodiments a feature catalog manager identifies and maintains a record of the features and associated feature properties that each of multiple processor cores of the computing device support. A two-level scheduler model is used, with a first level scheduler in the operating system scheduling applications for the multiple processor cores. Each application includes a second level scheduler that schedules user mode scheduled (UMS) threads for that application to run on particular ones of the processor cores. The second level scheduler can schedule UMS threads based at least in part on the features supported by the processor cores (as identified in the feature catalog manager) and/or whether the thread executes in kernel mode or user mode.

Figure 1:
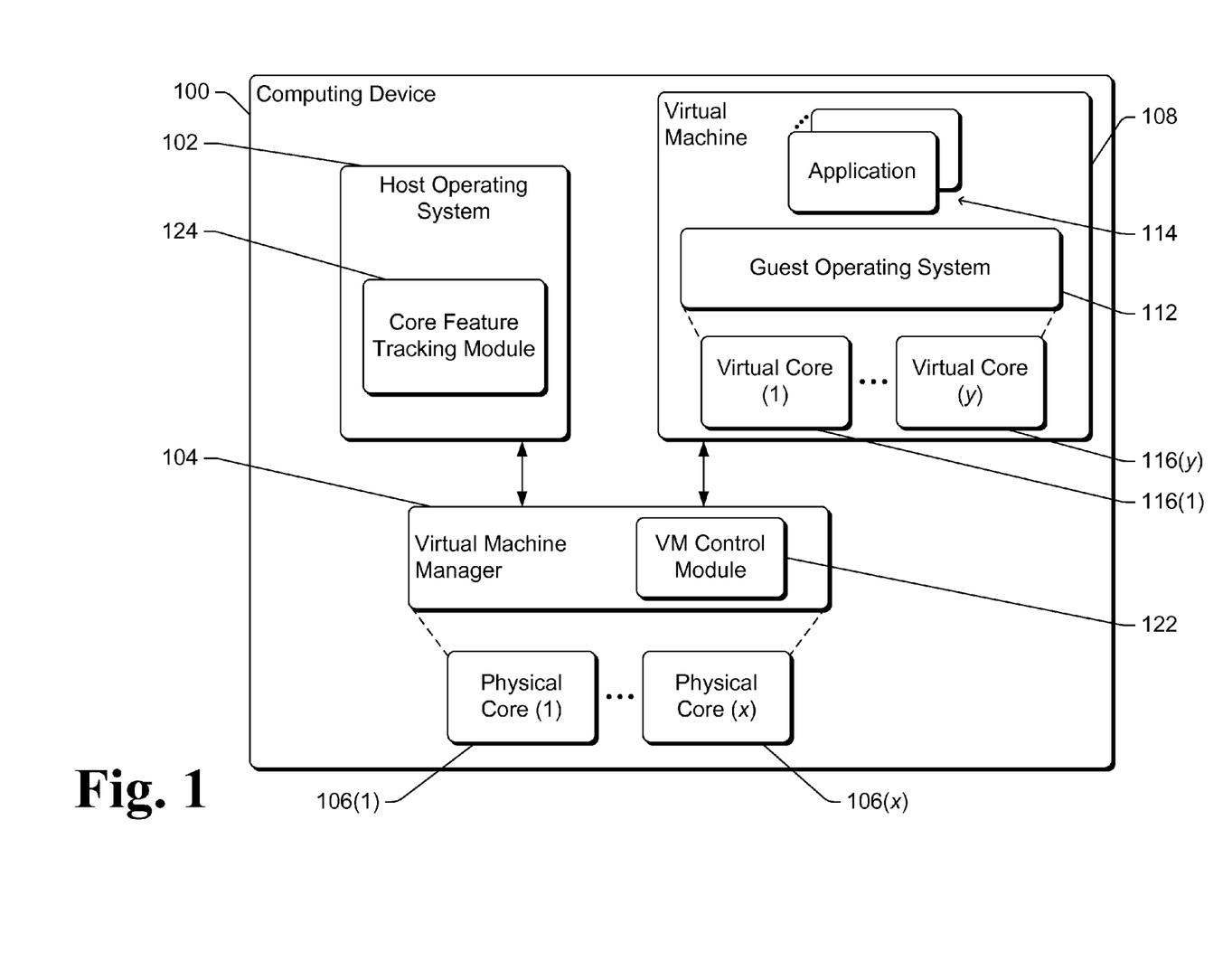
FIG. 1 is a block diagram illustrating an example computing device implementing the virtual machine and/or multi-level scheduling support on systems with asymmetric processor cores in accordance with one or more embodiments.

FIG. 1 is a block diagram illustrating an example computing device 100 implementing the virtual machine and/or multi-level scheduling support on systems with asymmetric processor cores in accordance with one or more embodiments. Computing device 100 can be a variety of different types of devices. For example, computing device 100 can be a server computer, a node in a distributed processing environment, a desktop computer, a mobile station, a netbook or laptop computer, a notepad or tablet computer, an entertainment appliance, a set-top box communicatively coupled to a display device, a television, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Virtual machine (VM) manager 104 runs or executes on one or more (x) physical processor cores 106(1), . . . , 106(x). One or more virtual machine managers 104 can be run on physical processor cores 106. Each physical processor core 106, also referred to as a physical core, is a distinct hardware processor or execution core for executing instructions. Multiple physical cores are typically included in a single chip or integrated circuit, which can also be referred to as a multi-core chip or multi-core processor. Although multiple physical cores can be included in a single chip, it should be noted that multiple such chips (each including multiple cores) can be included in computing device 100. Various additional components of computing device 100 can also be available to virtual machine (VM) manager 104, such as memory components, storage devices, communication components, and so forth. Although illustrated separately, it should be noted that virtual machine manager 104 can alternatively be included as part of host operating system 102.

Virtual machine manager 104 allows host operating system 102 and one or more virtual machines to run on computing device 100. A virtual machine refers to a software implementation of a computing device (or other machine or system) that can run programs analogous to a physical computing device. The virtual machine includes one or more virtual processor cores, also referred to as virtual cores, that are similar to (but software implementations of) the physical cores of a computing device. An operating system as well as other applications can execute on the virtual cores as they would execute on a physical core—the operating system and other applications executing on the virtual core need have no knowledge that they are executing on a virtual core.

A single virtual machine 108 is illustrated in computing device 100, although alternatively multiple virtual machines can run on computing device 100. Virtual machine manager 104 schedules the virtual cores to execute on one or more of the physical cores 106, so that the operating system and other application instructions to be executed by the virtual core are executed by a physical core 106. The particular physical core 106 for which a virtual core is scheduled can vary over time.

Virtual machine 108 includes a guest operating system 112, one or more applications 114, and one or more (y) virtual cores 116(1), . . . , 116(y). Guest operating system 112 runs or executes on one or more virtual cores 116(1), . . . , 106(y), and manages execution of applications 114.

Virtual machine manager 104 includes a virtual machine control module 122. Virtual machine control module 122 manages virtual machine 108, communicating with virtual machine 108 and scheduling virtual cores 116 for execution on physical cores 106.

Virtual machine manager 104 supports situations in which physical cores 106 support different features (referred to as asymmetric physical cores). It should be noted that two or more physical cores 106 can support the same features, although for asymmetric physical cores at least one physical core 106 supports different features than at least one other physical core 106.

Host operating system 102 includes a core feature tracking module 124 that identifies, for each physical core 106, the features that the physical core 106 supports. A feature of a physical core 106 refers to particular functionality that the physical core 106 supports. A physical core 106 supports a feature if the physical core 106 can execute types of instructions (e.g., understands operation codes (opcodes)) that provide that feature. The features that a physical core 106 supports can be identified in different manners, such as by particular functionality (e.g., a name or type of feature that includes multiple instruction types), by individual instruction types, and so forth. For example, a physical core 106 can indicate that it supports as a feature a base x86 instruction set, that it supports as a feature hardware AES (Advanced Encryption Standard) encryption/decryption, that is supports as a feature fast 128-bit vector extensions (e.g., Streaming SIMD Extensions (SSE)), and so forth. Core feature tracking module 124 can identify all features supported by physical cores 106, or alternatively only selected features. For example, all physical cores 106 may be assumed to support certain features (such as a base x86 instruction set), and the features identified by core feature tracking module 124 are extensions to those certain features (e.g., support for hardware AES encryption/decryption, support for fast 128-bit vector extensions, and so forth).

Core feature tracking module 124 can identify the features that a particular physical core 106 supports in a variety of different manners. In one or more embodiments, core feature tracking module 124 queries physical cores 106 for an indication of the features that each of the physical cores 106 supports. Core feature tracking module 124 can maintain a record of these features (e.g., a tree map of known features and cores 106 supporting those features) and retrieve the record when virtual machine manager 104 is re-executed at a later time, or alternatively can re-query physical cores 106 each time virtual machine manager 104 executes rather than maintaining a record of the features. In other embodiments, core feature tracking module 124 identifies the features that the physical cores 106 support in different manners, such as querying virtual machine manager 104 for an indication of the features that each physical core 106 supports, accessing a database or other record that associates supported features with particular physical cores (e.g., based on a serial number, model number, or other identifier of each physical core 106), and so forth.

Core feature tracking module 124 also includes an indication of the instructions that provide the features supported by physical cores 106. Core feature tracking module 124 can identify which instructions provide which features in different manners, such as being pre-configured with an indication of which instructions provide which features, receiving an indication of which instructions provide which features from the physical cores 106, receiving an indication of which instructions provide which features from operating system 102 and/or other components or modules of computing device 100, and so forth.

Virtual machine control module 122 determines a set of features that are supported by one or more physical cores 106 to make available to virtual cores 116. The features that virtual cores 116 support are the features that are made available to virtual cores 116 by virtual machine control module 122. Virtual cores 116 make that set of features available to guest operating system 112 (and thus also to applications 114). It should be noted that not all features supported by all physical cores 106 may be made available to virtual cores 116, as discussed in more detail below.

Virtual machine manager 104 has knowledge of how many virtual cores 116 are included in virtual machine 108. Virtual machine manager 104 is typically informed of the number of virtual cores 116 in virtual machine 108 when a request to create or execute virtual machine 108 is received by virtual machine manager 104. Alternatively, virtual machine manager 104 can be informed of the number of virtual cores 116 in virtual machine 108 at other times.

In one or more embodiments, virtual machine control module 122 determines, based at least in part on both the number of virtual cores 116 in virtual machine 108 and the features supported by each of physical cores 106, which features to make available to virtual cores 116. In such embodiments, virtual machine control module 122 determines that a feature is to be made available to virtual cores 116 if that feature is supported by at least as many physical cores 106 as there are virtual cores 116 in virtual machine 108. For example, if virtual machine 108 includes four virtual cores 116 and only two physical cores 106 support hardware AES encryption/decryption, then hardware AES encryption/decryption is determined to be a feature that is not made available to virtual cores 116. By way of another example, if virtual machine 108 includes two virtual cores 116 and two or more physical cores 106 support fast 128-bit vector extensions, then fast 128-bit vector extensions is determined to be a feature that is made available to virtual cores 116. Thus, rather than simply making available to virtual cores 116 features that are supported by all physical cores 106, whether a particular feature is made available to virtual cores 116 is based on both the number of virtual cores 116 in virtual machine 108 and the number of physical cores 106 that support the particular feature.

Figure 2:
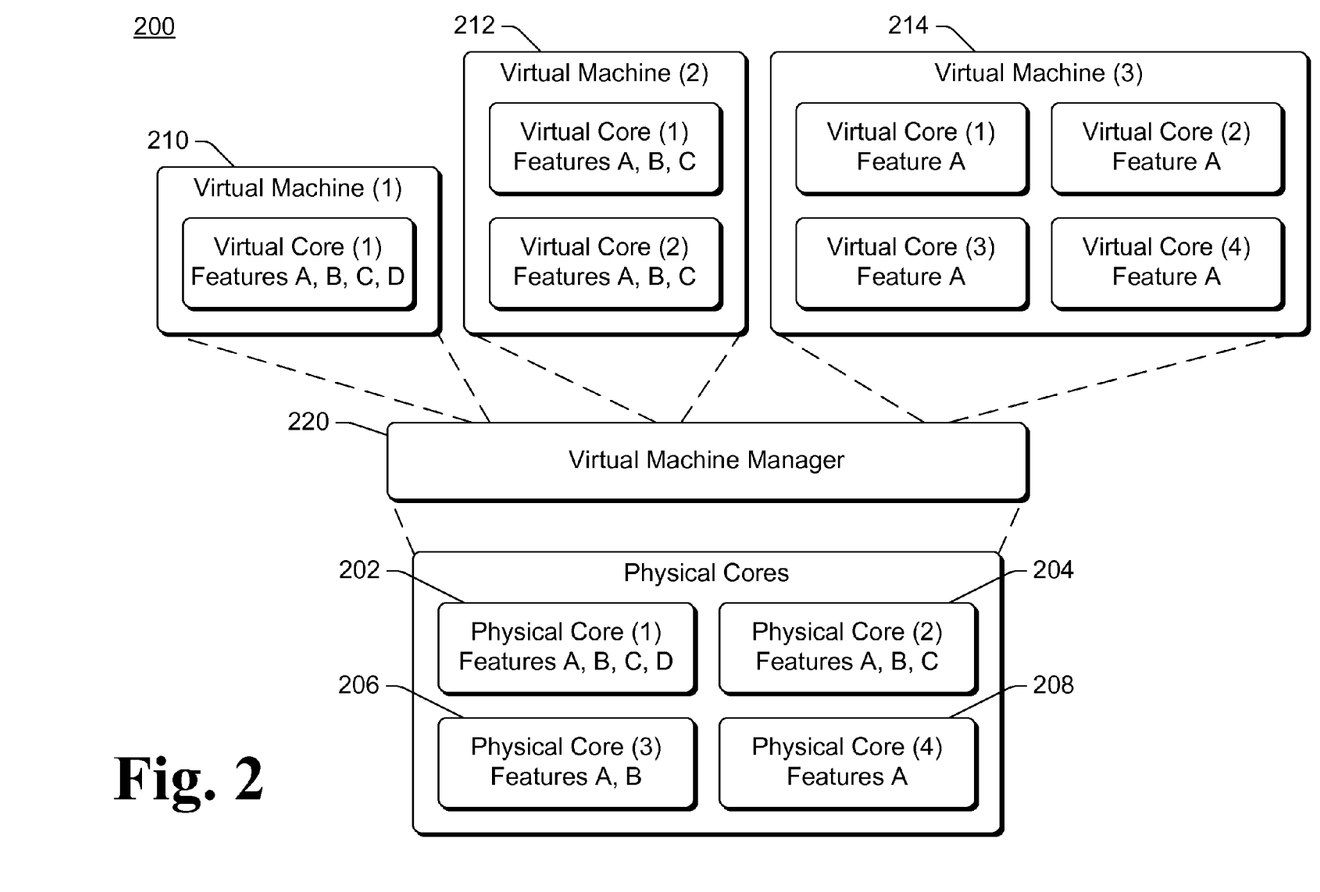
FIG. 2 illustrates an example computing device running multiple virtual machines in accordance with one or more embodiments.

FIG. 2 illustrates an example computing device 200 running multiple virtual machines in accordance with one or more embodiments. Computing device 200 can be, for example, a computing device 100 of FIG. 1. Computing device 200 includes four physical cores 202, 204, 206, and 208, each of which supports a different set of features. A variety of different features can be supported by physical cores 202-208, and for ease of explanation FIG. 2 is discussed with reference to four different features referred to as features A, B, C, and D. Physical core 202 supports four features referred to as features A, B, C, and D. Physical core 204 includes three features: features A, B, and C. Physical core 206 supports two features: features A and B. Physical core 208 supports one feature: feature A.

Computing device 200 also includes three virtual machines: virtual machine 210, virtual machine 212, and virtual machine 214. Virtual machine manager 220 allows virtual machines 210, 212, and 214 to run on physical cores 202-208 of computing device 200. Virtual machine manager 220 can be, for example, a virtual machine manager 104 of FIG. 1.

Virtual machine 210 includes one virtual core. As there is at least one physical core 202-208 that supports features A, B, C, and D, the features A, B, C, and D are made available to and also supported by the virtual core of virtual machine 210. It should be noted that, although the virtual core of virtual machine 210 supports features A, B, C, and D, the virtual core of virtual machine 210 can be scheduled by virtual machine manager 220 to execute on any of the physical cores 202-208.

Virtual machine 212 includes two virtual cores. As there are at least two physical cores 202-208 that support features A, B, and C, the features A, B, and C are made available to and also supported by the virtual cores of virtual machine 212. As there is only one physical core 202-208 that supports feature D, feature D is not supported by at least as many physical cores 202-208 as there are virtual cores in virtual machine 212. Accordingly, feature D is not made available to the virtual cores of virtual machine 212. It should be noted that, although the virtual cores of virtual machine 212 support features A, B, and C, the virtual cores of virtual machine 212 can be scheduled by virtual machine manager 220 to execute on any of the physical cores 202-208.

Virtual machine 214 includes four virtual cores. As there are at least four physical cores 202-208 that support feature A, the feature A is made available to and also supported by the virtual cores of virtual machine 214. As there are fewer than four physical cores 202-208 that support each of features B, C, and D, features B, C, and D are not supported by at least as many physical cores 202-208 as there are virtual cores in virtual machine 214. Accordingly, features B, C, and D are not made available to the virtual cores of virtual machine 212. It should be noted that the virtual cores of virtual machine 214 can be scheduled by virtual machine manager 220 to execute on any of the physical cores 202-208.

Returning to FIG. 1, in other embodiments virtual machine control module 122 determines which features to make available to virtual cores 116 in other manners. For example, virtual machine control module 122 can determine that a feature is to be made available to virtual cores 116 if that feature is supported by at least one physical core 106. For example, if hardware AES encryption/decryption is supported by at least one physical core 106, then hardware AES encryption/decryption is determined to be a feature that is made available to virtual cores 116.

Figure 3:
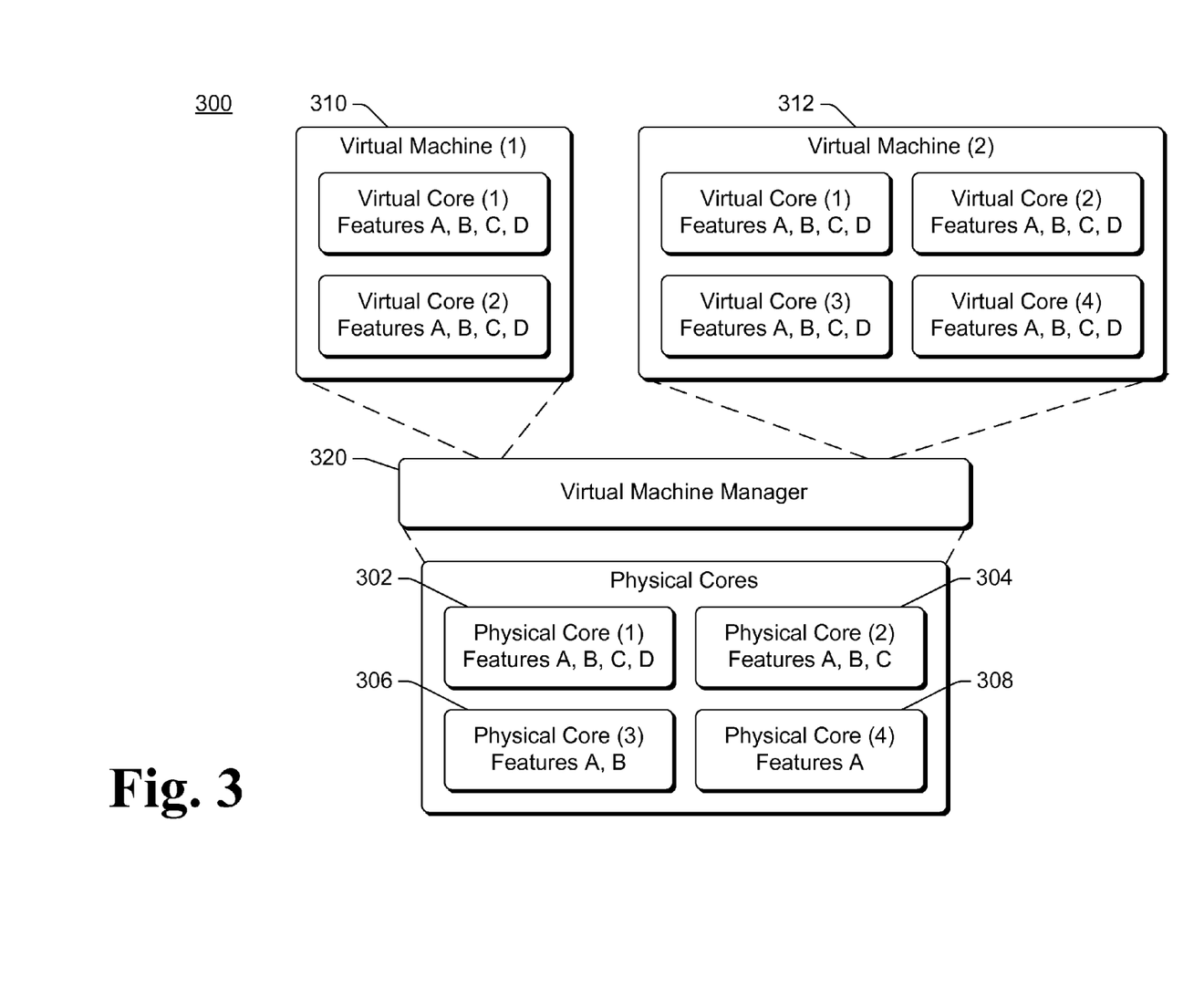
FIG. 3 illustrates an example computing device running multiple virtual machines in accordance with one or more embodiments.

FIG. 3 illustrates another example computing device 300 running multiple virtual machines in accordance with one or more embodiments. In the example of FIG. 3, a feature is made available to the virtual cores if that feature is supported by at least one physical core. The number of virtual cores is not taken into account when determining if a feature is to be made available to the virtual cores in the example of FIG. 3. Computing device 300 can be, for example, a computing device 100 of FIG. 1. Computing device 300 includes four physical cores 302, 304, 306, and 308, each of which supports a different set of features. A variety of different features can be supported by physical cores 302-308, and for ease of explanation FIG. 3 is discussed with reference to four different features referred to as features A, B, C, and D. Physical core 302 supports four features referred to as features A, B, C, and D. Physical core 304 includes three features: features A, B, and C. Physical core 306 supports two features: features A and B. Physical core 308 supports one feature: feature A.

Computing device 300 also includes two virtual machines: virtual machine 310 and virtual machine 312. Virtual machine manager 320 allows virtual machines 310 and 312 to run on physical cores 302-308 of computing device 300. Virtual machine manager 320 can be, for example, a virtual machine manager 104 of FIG. 1.

Virtual machine 310 includes two virtual cores. As there is at least one physical core 302-308 that supports features A, B, C, and D, the features A, B, C, and D are made available to and also supported by the two virtual cores of virtual machine 310. Similarly, virtual machine 312 includes four virtual cores. As there is at least one physical core 302-308 that supports features A, B, C, and D, the features A, B, C, and D are made available to and also supported by the four virtual cores of virtual machine 310.

Figure 4:
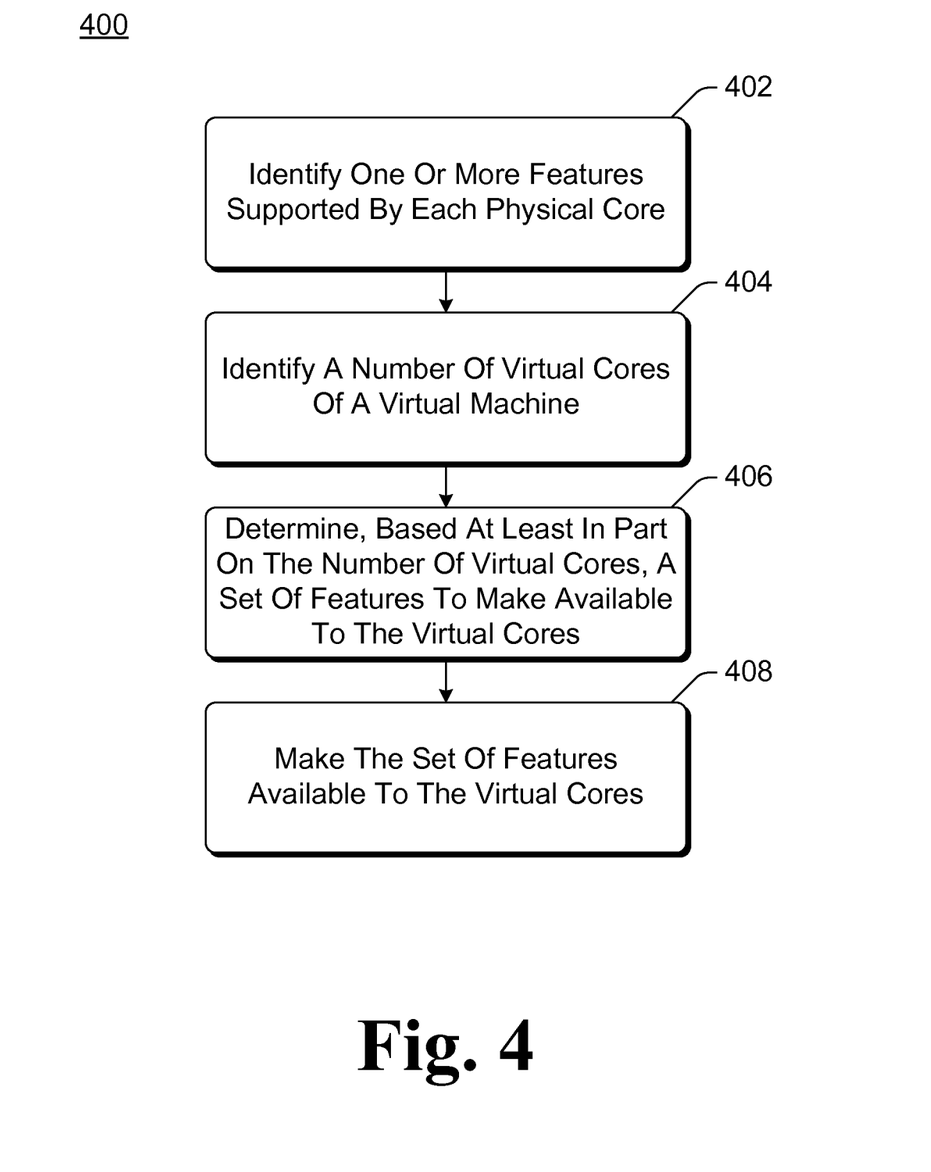
FIG. 4 is a flowchart illustrating an example process for a virtual machine manager determining a set of features to be made available to virtual cores of a virtual machine in accordance with one or more embodiments.

FIG. 4 is a flowchart illustrating an example process 400 for a virtual machine manager determining a set of features to be made available to virtual cores of a virtual machine in accordance with one or more embodiments. Process 400 is carried out by, for example, a virtual machine manager (such as virtual machine manager 104 of FIG. 1) of a computing device, and can be implemented in software, firmware, hardware, or combinations thereof. Process 400 is shown as a set of acts and is not limited to the order shown for performing the operations of the various acts. Process 400 is an example process for a virtual machine manager determining a set of features to be made available to virtual cores of a virtual machine; additional discussions of a virtual machine manager determining a set of features to be made available to virtual cores of a virtual machine are included herein with reference to different figures.

In process 400, one or more features supported by each physical core in the computing device implementing process 400 are identified (act 402). These features can be identified in different manners as discussed above.

A number of virtual cores of a virtual machine is also identified (act 404). How many virtual cores are in the virtual machine is typically identified when creation of the virtual machine is requested as discussed above, although can alternatively be identified at other times.

A set of features to make available to the virtual cores is determined based at least in part on the number of virtual cores (act 406). This determination can be, for example, that a feature is to be made available to the virtual cores if that feature is supported by at least as many physical cores as there are virtual cores in the virtual machine as discussed above.

The set of features determined in act 406 is made available to the virtual cores (act 408). Thus, the virtual cores can support the set of features determined in act 406.

Returning to FIG. 1, the instructions of guest operating system 112 and applications 114 that are executed by virtual cores 116 are actually executed by physical cores 106. Virtual machine control module 122 schedules virtual cores 116 for different physical cores 106, so that the instructions that are executed by a particular virtual core 116 are executed by the physical core 106 for which that virtual core 116 is scheduled. It should be noted that the particular physical core 106 for which a particular virtual core 116 is scheduled can vary over time, and can be changed by virtual machine control module 122. It should also be noted that multiple virtual cores 116 can be scheduled for the same physical core 106.

A variety of different techniques can be employed by virtual machine control module 122 in scheduling virtual cores 116 for physical cores 106. Virtual machine control module 122 can base the scheduling of virtual cores 116 on physical cores 106 on, for example, the availability of each physical core 106, the bandwidth used by each virtual core 116 and/or virtual machine 108, and so forth.

In one or more embodiments, virtual machine control module 122 bases the scheduling of virtual cores 116 on physical cores 106 at least in part on the features supported by each of physical cores 106. Situations can arise where a feature that is supported by a virtual core 116 is not supported by the physical core 106 that that virtual core 116 is scheduled on. For example, referring to FIG. 2, the virtual cores of virtual machine 212 support feature C, but if a virtual core of virtual machine 212 is scheduled for physical core 206 and attempts to execute instructions for feature C, physical core 206 cannot execute the instructions because it does not support feature C.

When a situation arises in which a virtual core 116 attempts to execute an instruction that is not supported by the physical core 106 for which the virtual core 116 is scheduled, an error or exception is indicated by the physical core 106. This error or exception can be, for example, an undefined opcode extension (also referred to as #UD). The error or exception indicated by the physical core 106 is returned to virtual machine control module 122 (e.g., by host operating system 102), and virtual machine control module 122 determines whether the error or exception is a result of a feature that was indicated to virtual cores 116 as being supported but is not supported by the physical core 106 for which the virtual core 116 is scheduled. Virtual machine control module 122 maintains a record of which features were made available to virtual cores 116 and, in conjunction with the known features of physical cores 106 and which instructions provide which features (e.g., as maintained by core feature tracking module 124), can readily determine whether the error or exception is a result of a feature that was indicated to virtual cores 116 as being supported but is not supported by the physical core 106 for which the virtual core 116 is scheduled. Alternatively, virtual machine control module 122 can determine whether the error or exception is a result of a feature that was indicated to virtual cores 116 as being supported but is not supported by the physical core 106 for which the virtual core 116 is scheduled in other manners, such as by scheduling the virtual core for the physical core 106 supporting the most features (e.g., physical core 302 of FIG. 3)—if the error or exception persists, then the error or exception is not a result of a feature that was indicated to virtual cores 116 as being supported but is not supported by the physical core 106 for which the virtual core 116 is scheduled.

If virtual machine control module 122 determines that the error or exception is a result of a feature that was indicated to virtual cores 116 as being supported but is not supported by the physical core 106 for which the virtual core 116 is scheduled, then virtual machine control module 122 schedules the virtual core 116 for a different physical core 106. In one or more embodiments, virtual machine control module 122 schedules the virtual core 116 for a physical core 106 that supports a feature that includes the instruction that caused the error or exception. An indication of the instruction that caused the error or exception can be returned to virtual machine control module 122 by physical core 106 as part of the error or exception. Alternatively, virtual machine control module 122 can schedule the virtual core 116 for a physical core 106 in other manners. For example, virtual machine control module 122 can select another physical core at random or in accordance with some other rule or criteria.

Figure 5:
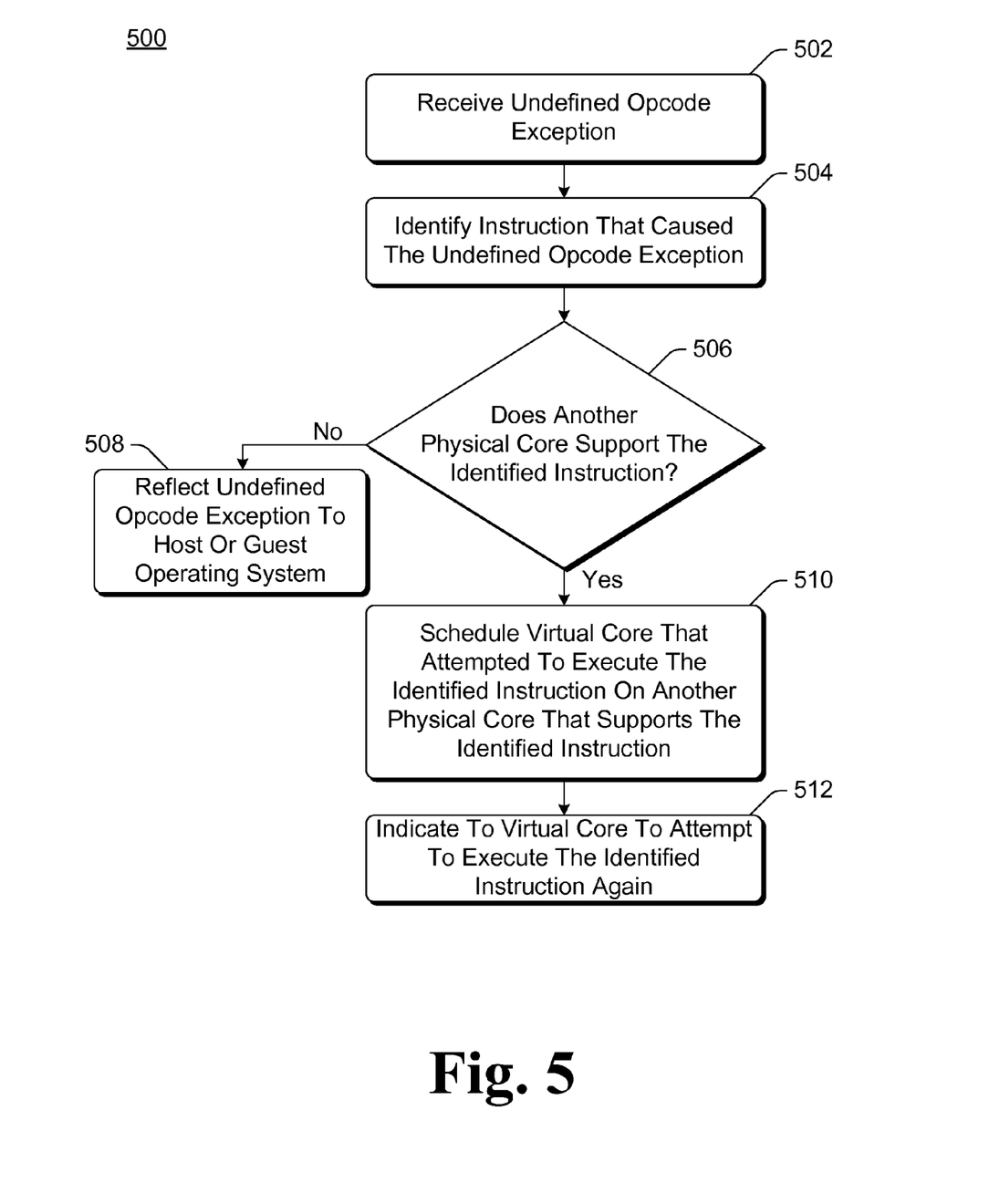
FIG. 5 is a flowchart illustrating an example process for rescheduling a virtual core in accordance with one or more embodiments.

FIG. 5 is a flowchart illustrating an example process 500 for rescheduling a virtual core in accordance with one or more embodiments. Process 500 is carried out by, for example, a virtual machine manager (such as virtual machine manager 104 of FIG. 1) of a computing device, and can be implemented in software, firmware, hardware, or combinations thereof. Process 500 is shown as a set of acts and is not limited to the order shown for performing the operations of the various acts. Process 500 is an example process for rescheduling a virtual core; additional discussions of rescheduling a virtual core are included herein with reference to different figures.

In process 500, an undefined opcode exception is received (act 502). The undefined opcode exception (#UD) is received from a physical core in response to an attempt to execute an instruction that is not supported by the physical core.

In response to receiving the undefined opcode exception, an instruction that caused the undefined opcode exception is identified (act 504). This instruction can be identified by, for example, the physical core from which the undefined opcode exception was received.

A check is then made (act 506) as to whether another physical core other than the physical core from which the undefined opcode exception was received in act 502 supports the instruction identified in act 504. This check can be made, for example, based on knowledge of the features supported by the physical cores as discussed above.

If no other physical core supports the instruction identified in act 504, then the undefined opcode exception is reflected to the operating system (act 508). This operating system can be the host operating system or a guest operating system, depending on whether an instruction of the host operating system (or application running on the host operating system) or an instruction from the guest operating system (or an application running on the guest operating system) caused the undefined opcode exception. For example, if the instruction that caused the undefined opcode exception is executed by a virtual core of a particular virtual machine, then the undefined opcode exception is reflected to the guest operating system of that particular virtual machine. If no physical cores support the instruction identified in act 504, then the undefined opcode exception is due to some other problem other than a feature that was indicated to virtual cores as being supported is not supported by the physical core for which the virtual core is scheduled. Accordingly, the undefined opcode exception is provided to the operating system to resolve.

However, if there is another physical core that supports the instruction identified in act 504, then the virtual core that attempted to execute the identified instruction that cause the undefined opcode exception is scheduled for another physical core that supports the identified instruction (act 510). The virtual machine control module then indicates to the virtual core to attempt to execute the identified instruction again (act 512). As the virtual core is scheduled for a physical core that supports the instruction, this subsequent attempt to execute the identified instruction should not result in an undefined opcode exception. In one or more embodiments, the virtual core remains scheduled for the physical core that supports the instruction. The virtual core is thus provided a temporal affinity or "stickiness" to that physical core so that the virtual core remains scheduled for that physical core for an amount of time (e.g., until a particular amount of time elapses, until a particular event occurs such as another exception or another virtual core is scheduled for execution on that physical core, and so forth). Alternatively, after the identified instruction has been executed the virtual core can be re-scheduled for a different physical core (e.g., the physical core that the virtual core was scheduled for when the undefined opcode exception was received).

In an alternative embodiment, a trial and error technique is used rather than checking whether another physical core supports the identified instruction in act 506. Another physical core is selected (e.g., a physical core is randomly selected, a physical core supporting more features than the physical core from which the undefined opcode exception was received in act 502, etc.), the virtual core is scheduled for the selected physical core in act 510, and the virtual machine control module then indicates to the virtual core to attempt to execute the identified instruction again in act 512. If the attempted execution of the identified instruction results in another undefined opcode exception, then process 500 is repeated until each of the physical cores has been selected (or the physical core that supports the most features has been selected). If the identified instruction is executed by a physical core, then the virtual core can remain scheduled for that physical core for an amount of time. However, if the identified instruction results in an undefined opcode exception from each physical core, then the undefined opcode exception is reflected to the host operating system in act 508.

Returning to FIG. 1, in one or more embodiments virtual machine control module 122 also monitors the frequency with which different features are used and the physical cores 106 that support those different features. This monitoring can be used by virtual machine control module 122 to determine which features are made available to the virtual cores of subsequent virtual machines. For example, a usage indication for a feature can be determined that is a frequency of the use of the feature divided by the number of physical cores 106 that support the feature. If the usage indication of a particular feature exceeds a threshold amount, then virtual machine control module 122 can determine that the feature is not made available to virtual cores of subsequently created virtual machines. Virtual machine control module 122 can thus dynamically make features available or unavailable to new virtual machines as those new virtual machines are created.

By way of example, assume that there are four physical cores 106 and that the hardware AES encryption/decryption feature is supported by only one physical core 106. If the hardware AES encryption/decryption is a commonly used feature by applications 114 and/or guest operating system 112, then the single physical core 106 that supports the hardware AES encryption/decryption feature can become oversubscribed or over-utilized (e.g., have more virtual cores scheduled for it than are scheduled for other physical cores). In order to assist in evening out the scheduling of virtual cores across all of the physical cores, virtual machine control module 122 can identify this over-subscription or over-utilization situation, and in response determine that the feature is not made available to virtual cores for another virtual machine if another virtual machine is subsequently created on computing device 100.

It should be noted that virtual machine 108 need have no, and typically has no, knowledge of the manner in which virtual machine manager 104 determines which features of physical cores 106 are made available to virtual machine 108. Thus, virtual machine 108 proceeds to operate with virtual cores 116 regardless of the manner in which virtual machine manager 104 determines which features supported by physical cores 106 are made available to virtual machine 108.

Additionally, in one or more embodiments a multi-level scheduler model is used to schedule user mode scheduled (UMS) application threads for execution on processor cores. Traditional scheduling models typically have only system (e.g., operating system) threads and application threads. System threads are typically run in a higher privilege level (e.g., in kernel mode or ring 0), and application threads are typically run both in lower privilege levels (e.g., in user mode or ring 3) when performing user or application operations, and enter the higher privilege level (e.g., ring 0) when invoking an operating system service through a system call or exception. In contrast to such traditional models, the multi-level scheduler model makes use of UMS threads. UMS threads are a particular class of threads that have a single thread split into different portions that are a user thread and a kernel thread. This split is leveraged by the multi-level scheduler module discussed herein, allowing the application to schedule the user thread by having a second level scheduler running in user mode (needing no help or interference from the operating system kernel) while the operating system kernel manages the kernel thread by scheduling the kernel thread as appropriate when kernel services are run.

This multi-level scheduler model can leverage the asymmetric nature of the processor cores, scheduling application threads for execution based on the features supported by the processor cores. In one or more embodiments, the multi-level scheduler model includes a first level scheduler in the operating system that schedules applications for multiple processor cores and schedules kernel threads of UMS threads. Each application includes a second level scheduler that schedules user threads of UMS threads for that application to run on particular ones of the processor cores.

Figure 6:
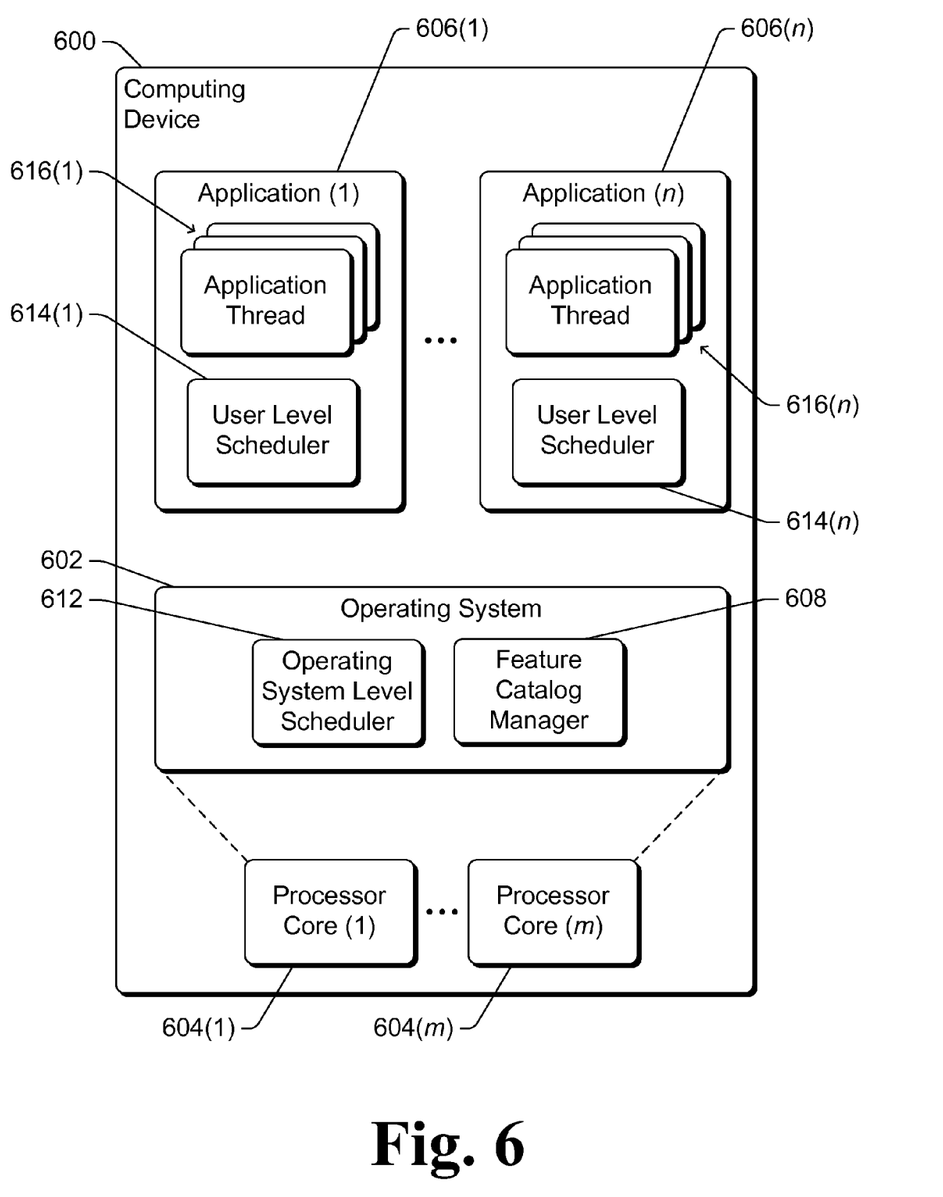
FIG. 6 illustrates an example computing device implementing a multi-level scheduler model in accordance with one or more embodiments.

FIG. 6 illustrates an example computing device 600 implementing a multi-level scheduler model in accordance with one or more embodiments. Computing device 600 includes an operating system 602, one or more (m) processor cores 604(1), . . . , 604(m), and one or more (n) applications 606(1), . . . , 606(n). Computing device 600 can be, for example, a computing device 100 of FIG. 1. Operating system 602 can be, for example, a host operating system 102 or guest operating system 112 of FIG. 1. Processor cores 604(1), . . . , 604(m) can be, for example, physical cores 106(1), . . . , 106(x) or virtual cores 116(1), . . . , 116(y) of FIG. 1. Applications 606(1), . . . , 606(n) can be, for example, one or more applications 114 of FIG. 1. Thus, operating system 602 and applications 606(1), . . . , 606(n) can be running natively on physical processor cores, or can be running within a virtual machine (e.g., virtual machine 108 of FIG. 1).

Operating system 602 includes a feature catalog manager 608 that identifies and maintains a record, also referred to as a catalog, of the features supported by processor cores 604. Feature catalog manager 608 can be, for example, core feature tracking module 124 of FIG. 1. The record maintained by feature catalog manager 608 can be all features supported by processor cores 604, or alternatively only selected features. For example, all processor cores 604 may be assumed to support certain features (such as a base x86 instruction set), and the features identified by feature catalog manager 608 are extensions to those certain features (e.g., support for hardware AES encryption/decryption, support for fast 128-bit vector extensions, and so forth). Although illustrated as being part of operating system 602, feature catalog manager 608 can alternatively be implemented separately from operating system 602. Different processor cores 604 can support different features as discussed above. Feature catalog manager 608 can identify the features that a particular processor core 604 supports in a variety of different manners.

In one or more embodiments, during the initialization process of operating system 602 when operating system 602 begins running, operating system 602 invokes feature catalog manager 608. Feature catalog manager 608 queries processor cores 604 for an indication of the features that each of the processor cores 604 supports. Feature catalog manager 608 can re-query processor cores 604 each time operating system 602 executes, or alternatively can maintain a record of these features and retrieve the record when operating system 602 is re-executed at a later time rather than re-querying processor cores 604. In other embodiments, feature catalog manager 608 identifies the features that the processor cores 604 support in different manners, such as querying operating system 602 for an indication of the features that each processor core 604 supports, accessing a database or other record that associates supported features with particular processor cores (e.g., based on a serial number, model number, or other identifier of each processor core 604), and so forth.

Feature catalog manager 608 also identifies and maintains a record of one or more feature properties associated with features supported by processor cores 604. Feature catalog manager 608 can identify these associated feature properties in a variety of different manners, analogous to the manner in which the features of processor cores 604 are identified as discussed above. Feature properties associated with a feature identify performance characteristics of the feature and/or requirements that the application 606 is to satisfy in order to use the feature. The particular one or more properties associated with a particular feature can depend on the feature itself. For example, a feature property associated with a feature can be an access latency when using feature, a number of entities and thread stack consumption when using the feature, volatile/non-volatile states when using the feature, and so forth.

Feature catalog manager 608 is accessible to operating system 602 and applications 606. Accordingly, the record of features and associated feature properties can be used by operating system 602 in scheduling applications 606 and by applications 606 in scheduling application threads as discussed in more detail below.

Operating system 602 also includes an operating system level scheduler 612, which is a first level scheduler in the multi-level scheduler model employed by computing device 600. Operating system level scheduler 612 schedules applications 606 for the different processor cores 604, determining which application 606 is able to execute on which processor cores 604 at which times. Operating system level scheduler 612 also schedules kernel threads of UMS threads in applications 606. This scheduling by operating system level scheduler 612 can be performed in any of a variety of manners, such as using a round robin technique, a weighted round robin technique, allowing one or more applications 606 to have priority for execution over other applications 606, and so forth. Operating system level scheduler 612 can also optionally schedule applications 606 based at least in part on the record of features and associated feature properties maintained by feature catalog manager 608. For example, operating system level scheduler 612 can determine a duration for which an application 606 is to be scheduled for processor cores 604 based on the features and/or associated feature properties of processor cores 604, can determine when a particular application 606 is to be scheduled for processor cores 604 based on the features and/or associated feature properties of processor cores 604, and so forth.

Each application 606 also includes a user level scheduler 614, which is a second level scheduler in the multi-level scheduler model employed by computing device 600. Each user level scheduler 614 schedules user threads of application threads 616 (in the same application 606 as that user level scheduler 614) to run on particular ones of processor cores 604. These application threads 616 are UMS threads that can have both a user thread and kernel thread as discussed above.

Accordingly, the first level scheduler schedules applications for execution on processor cores 604, and when an application is scheduled for execution on processor cores 604 the second level scheduler schedules user threads for that application for execution on processor cores 604 while the first level scheduler schedules kernel threads for that application for execution on processor cores 604.

Each user level scheduler 614 can schedule application threads 616 based at least in part on the record of features and associated feature properties maintained by feature catalog manager 608. For example, user level scheduler 614 can determine a duration for which an application thread 616 is to be scheduled for processor cores 604 based on the features and/or associated feature properties of processor cores 604, can determine when a particular application thread 616 is to be scheduled for processor cores 604 based on the features and/or associated feature properties of processor cores 604, and so forth.

In one or more embodiments, user level scheduler 614 selects particular ones of processor cores 604 on which application threads 616 will be executed. The processor cores selected by user level scheduler 614 can be based at least in part on the record of features and associated feature properties maintained by feature catalog manager 608. For example, user level scheduler 614 may schedule application threads 616 for execution on processor cores 604 that support particular features (e.g., support hardware AES encryption/decryption), may schedule application threads for execution on processor cores 604 that support a particular feature having less than a threshold access latency, and so forth.

In addition to processor cores 604 supporting different features, different types of processor cores having different performance levels can be included in computing device 600. Different types of processor cores 604 can be included in computing device 600, such as high-performance processor cores that have many (e.g., 8 or more) pipelines for executing instructions and consume large amounts of powers, and lower-performance processor cores that have fewer (e.g., 1) pipelines for executing instructions and consume less power. Thus, these different types of processor cores 604 can be differentiated based on how quickly they can execute instructions and/or an amount of power they consume, rather than the particular features that they support. Information identifying which types of processor cores are included in computing device 600, and which processor cores 604 are which types of processor cores, can be included in feature catalog manager 608 or alternatively obtained by user level schedulers 614 elsewhere (e.g., from operating system 602). For example, feature catalog manager 608 can obtain information identifying which types of processor cores are included in computing device 600 (and which processor cores 604 are which types of processor cores) when feature catalog manager 608 identifies the features that the processor cores 604 support as discussed above.

User level scheduler 614 can also schedule application threads 616 for execution on processor cores 604 based on the types of the processor cores 604. For example, user level scheduler 614 can schedule application threads 616 for execution only on the high-performance processor cores 604, or alternatively only on the lower-performance processor cores 604. Alternatively, user level scheduler 614 can schedule application threads 614 for execution across all processor cores 604 without regard for the performance levels of the processor cores 604. User level scheduler 614 can identify the processor cores 604 on which application threads 616 can be scheduled for execution in different manners, such as an indication of the processor cores 604 on which application threads 616 can be scheduled being pre-configured in user level scheduler 614, an indication of the processor cores 604 on which application threads 616 can be scheduled being provided to user level scheduler 614 by operating system 602 or another component or module of computing device 600, and so forth.

Additionally, instructions on computing device 600 can typically execute in one of multiple different privilege levels, such as in a user mode or a kernel mode as discussed above. Instructions that are included in business logic of applications 606 typically execute in application threads 616 in user mode (e.g., as one or more user threads of the UMS thread), while operating system functionality invoked by application threads 616 typically executes in kernel mode (e.g., as one or more kernel threads of the UMS thread). While an application 606 is scheduled for processor cores 604 by operating system level scheduler 612, the application 606 can execute both application threads 616 in user mode and invoke operating system functionality that executes in kernel mode.

User level scheduler 614 schedules application threads 616 executing in user mode on processor cores 604 as discussed above. When operating system functionality that executes in kernel mode is invoked by an application thread 616, however, the processor cores 604 on which the kernel mode instructions are executed can be different. The particular processor cores 604 on which the kernel mode instructions are executed can be indicated to operating system 602 by user level scheduler 614 (or alternatively another component or module of application 606). Alternatively, the particular processor cores 604 on which the kernel mode instructions are executed can be determined by operating system 602 in other manners, such as operating system level scheduler 612 determining the particular processor cores 604 on which the kernel mode instructions are executed, operating system 602 being pre-configured with an indication of the particular processor cores 604 on which the kernel mode instructions are executed, operating system 602 accessing a registration store or other database or record indicating the particular processor cores 604 on which the kernel mode instructions are executed, and so forth.

Thus, the application threads 616 can execute in user mode on one set of processor cores 604, and operating system functionality can execute in kernel mode on another set of processor cores 604. For example, application threads 616 can execute in user mode on all processor cores 604, and operating system functionality can execute in kernel mode only on the high-performance processor cores 604. By way of another example, application threads 616 can execute in user mode on only the lower-performance processor cores 604, and operating system functionality can execute in kernel mode only on the high-performance processor cores 604.

It should be noted that this multi-level scheduler model supports a variety of additional usage scenarios. For example, because user level scheduler 614 of an application 606 is responsible for scheduling application threads 616 of that application 606, characteristics of components accessed by application threads 616 are abstracted from application threads 616 and application threads 616 are alleviated of the burden of needing knowledge regarding these characteristics. The different features supported by processor cores 604 are abstracted from application threads, as is the memory topology used by computing device 600 (e.g., the memory topology internal to computing device 600 and/or in a system including computing device 600) and the manner in which processor cores access the memory topology. User level scheduler 614, however, can take these characteristics into account when scheduling application threads 616 for execution. Thus, for example, user level scheduler 614 can take into account the memory topology and memory latency (which can be included, for example, in feature catalog manager 608 as feature properties associated with memory access features) when scheduling application threads 616.

Figure 7:
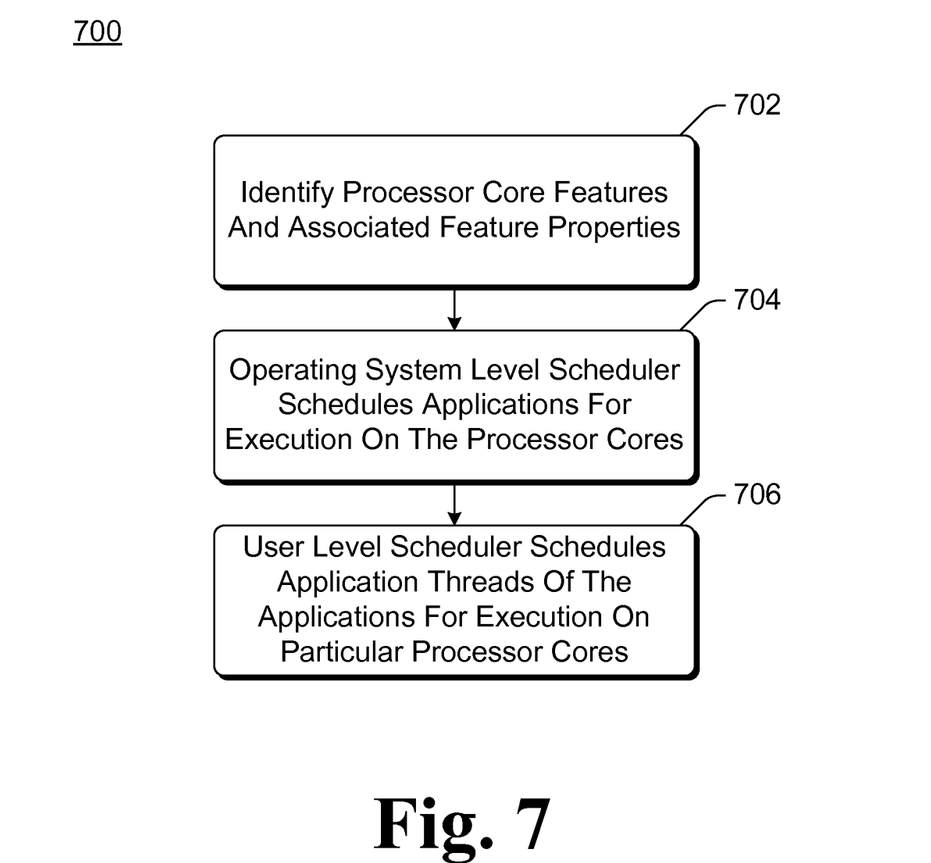
FIG. 7 is a flowchart illustrating an example process for a computing device implementing a multi-level scheduler model in accordance with one or more embodiments.

FIG. 7 is a flowchart illustrating an example process 700 for a computing device implementing a multi-level scheduler model in accordance with one or more embodiments. Process 700 is carried out by a computing device, such as computing device 600 of FIG. 1, and can be implemented in software, firmware, hardware, or combinations thereof. Process 700 is shown as a set of acts and is not limited to the order shown for performing the operations of the various acts. Process 700 is an example process for a computing device implementing a multi-level scheduler model; additional discussions of a computing device implementing a multi-level scheduler model are included herein with reference to different figures.

In process 700, features and associated feature properties of the processor cores are identified (act 702). These processor cores can be virtual cores or physical cores as discussed above, and the features and associated feature properties can be identified in different manners as discussed above.

An operating system level scheduler schedules applications for execution on the processor cores (act 704). This scheduling can be determined based at least in part on the processor core features and associated feature properties identified in act 702, as discussed above.

When a particular application is scheduled for execution, a user level scheduler of that particular application schedules threads of the application for execution on particular processor cores (act 706). This scheduling can be determined based at least in part on the processor core features and associated feature properties identified in act 702, as discussed above.

Figure 8:
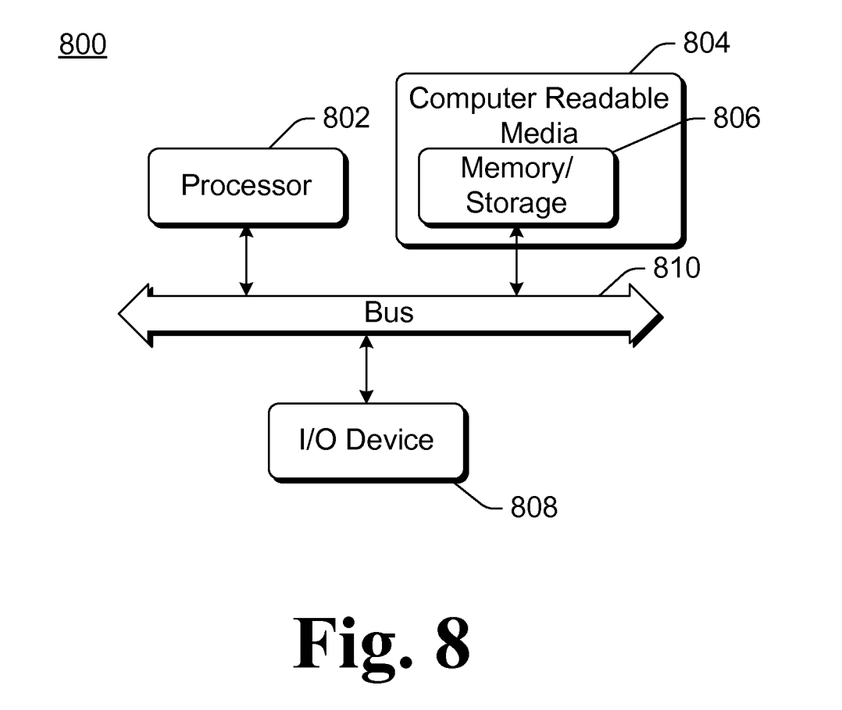
FIG. 8 illustrates an example computing device that can be configured to implement the virtual machine and/or multi-level scheduling support on systems with asymmetric processor cores in accordance with one or more embodiments.

FIG. 8 illustrates an example computing device 800 that can be configured to implement the virtual machine and/or multi-level scheduling support on systems with asymmetric processor cores in accordance with one or more embodiments. Computing device 800 can be, for example, computing device 100 of FIG. 1 or computing device 600 of FIG. 6.

Computing device 800 includes one or more processors or processing units 802 that include multiple physical cores, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the virtual machine and/or multi-level scheduling support on systems with asymmetric processor cores techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a computing device, the method comprising:
receiving, from a physical processor core on which a thread is scheduled, an undefined opcode exception indicating that that physical processor core does not support an instruction that caused the undefined opcode exception;
identifying the instruction that caused the undefined opcode exception;
selecting a second physical processor core which supports the instruction; and
scheduling the thread to run on the second physical processor core starting at the identified instruction that caused the undefined opcode exception, the second physical processor core supporting functionality which supports the identified instruction.

2. The method as recited in claim 1, further comprising providing the identified instruction that caused the undefined opcode exception to an operating system of the computing device if the instruction is not supported by the one or more physical processor cores.

3. The method as recited in claim 1, wherein scheduling the thread to run on the second physical processor core comprises scheduling a virtual processor core on the second physical processor core that supports the identified instruction that caused the undefined opcode exception.

4. The method as recited in claim 1, further comprising, responsive to the scheduling, causing the thread to run on the second physical processor core starting at the identified instruction that caused the undefined opcode exception.

5. The method as recited in claim 1, further comprising determining a set of features of the second physical processor core to make available to a virtual processor core of a virtual machine associated with the second physical processor core.

6. The method as recited in claim 5, further comprising, responsive to the determining, making the set of features of the second physical processor core available to the virtual processor core of the virtual machine.

7. A method in a computing device, the method comprising:
responsive to determining that a number of features for execution by a particular processor core from among multiple processor cores exceeds a number of features capable of being executed by the particular processor core without causing an undefined opcode exception indicating that a physical processor core does not support an instruction that causes the undefined opcode exception:
identifying, for each of multiple processor cores of the computing device, one or more features supported by the processor core, the one or more features including functionality supported by a physical processor core of the processor core;
scheduling, by an operating system level scheduler of an operating system of the computing device, multiple applications for execution on the multiple processor cores; and
scheduling, by a user level scheduler of one application of the multiple applications and based at least in part on the one or more features supported by the physical processor cores of the multiple processor cores, application threads of the one application for execution on one or more of the multiple processor cores, the application thread being derived from a user mode scheduled application thread.

8. The method as recited in claim 7, wherein the identifying further comprises identifying one or more feature properties associated with each of the one or more features, and wherein the scheduling application threads further comprises scheduling user mode scheduled application threads of the application based at least in part on the one or more feature properties associated with each of the one or more features.

9. The method as recited in claim 7, further comprising scheduling application threads that execute in a user mode on a first set of processor cores of the multiple processor cores, and scheduling operating system functionality that executes in a kernel mode on a second set of processor cores of the multiple processor cores, wherein the first set of processor cores and the second set of processor cores include different ones of the multiple processor cores.

10. The method as recited in claim 7, wherein the scheduling by the user level scheduler is further based at least in part on one or more memory access features that abstract a memory topology used by the computing device from the one application.

11. The method as recited in claim 7, further comprising maintaining a record of both the features supported by the multiple processor cores and one or more feature properties associated with one or more of the features supported by the multiple processor cores.

12. The method as recited in claim 7, wherein the multiple processor cores comprise multiple virtual processor cores of a virtual machine of the computing device.

13. The method as recited in claim 7, wherein the multiple processor cores comprise multiple physical processor cores of the computing device.

14. The method as recited in claim 7, wherein a first portion of the user mode scheduled application thread includes the application thread and a second portion of the user mode scheduled application thread includes a kernel thread.

15. The method as recited in claim 14, wherein the scheduling by the operating system level scheduler is based at least in part on the kernel thread included in the second portion of the user mode scheduled application thread.

16. The method as recited in claim 7, wherein the scheduling by the operating system level scheduler is based at least in part on a portion of the user mode scheduled application thread.

17. The method as recited in claim 7, wherein the operating level scheduler and the user level scheduler each make use of a user mode scheduled application thread, the user mode scheduled application thread being a single thread that includes a kernel thread and an application thread.

18. A system comprising:
one or more processors; and
memory storing instructions which, when executed by the one or more processors, configure the one or more processors to perform acts comprising:
identifying, for each of multiple physical processor cores of the computing device, one or more features supported by the physical processor core, the one or more features including functionality supported by the physical processor core as opposed to causing an undefined opcode exception indicating that the physical processor core does not support an instruction that causes the undefined opcode exception;

scheduling, by an operating system level scheduler of an operating system of the computing device, multiple applications for execution on the multiple physical processor cores; and scheduling, by a user level scheduler of one application of the multiple applications and based at least in part on the one or more features supported by the multiple physical processor cores, application threads of the one application for execution on one or more of the multiple physical processor cores, the application thread being derived from a user mode scheduled application thread.

19. The system as recited in claim 18, wherein the operating level scheduler and the user level scheduler each make use of a user model scheduled application thread, the user mode scheduled application thread being a single thread that includes a kernel thread and an application thread.

20. The system as recited in claim 18, further comprising scheduling application threads that execute in a user mode on a first set of processor cores of the multiple physical processor cores, and scheduling operating system functionality that executes in a kernel mode on a second set of physical processor cores of the multiple physical processor cores, wherein the first set of physical processor cores and the second set of physical processor cores include different ones of the multiple physical processor cores.

* * * * *